United States Patent Office 3,605,684
Patented Sept. 20, 1971

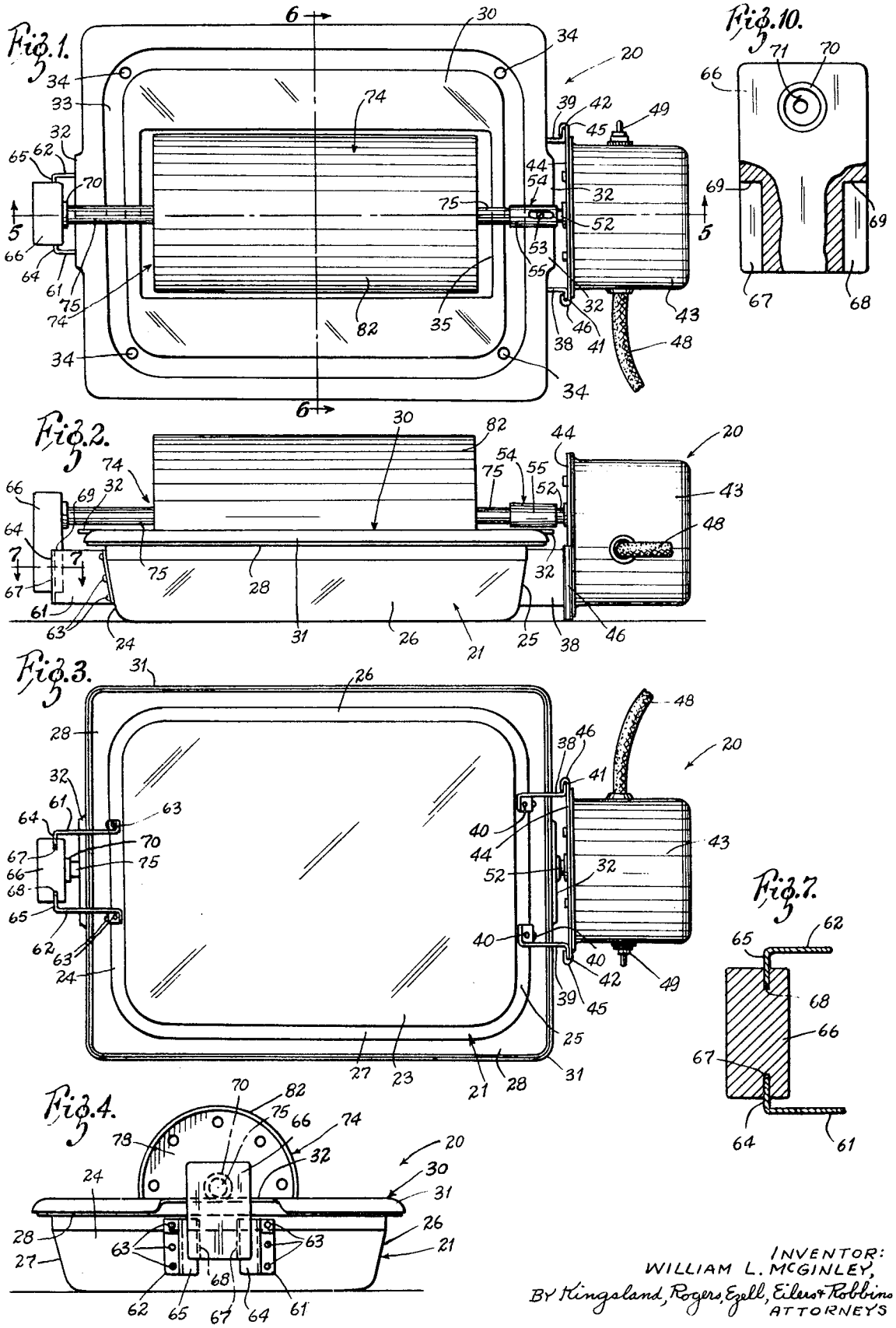

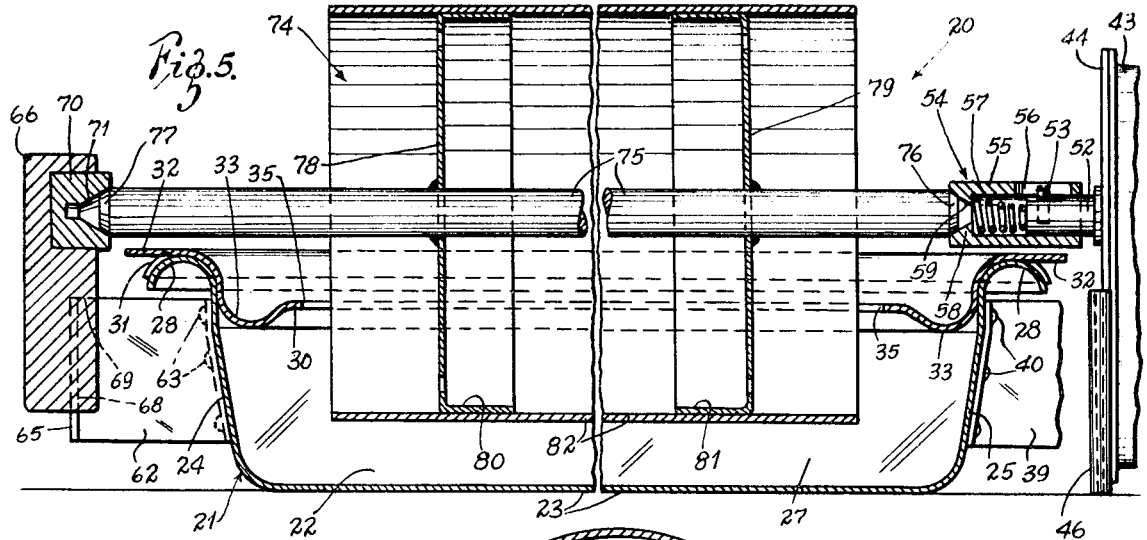
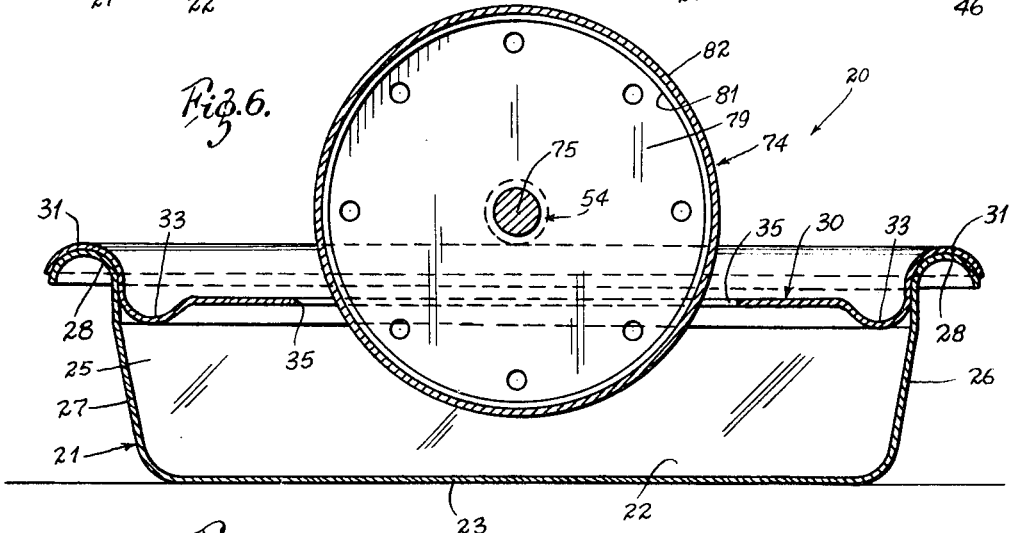
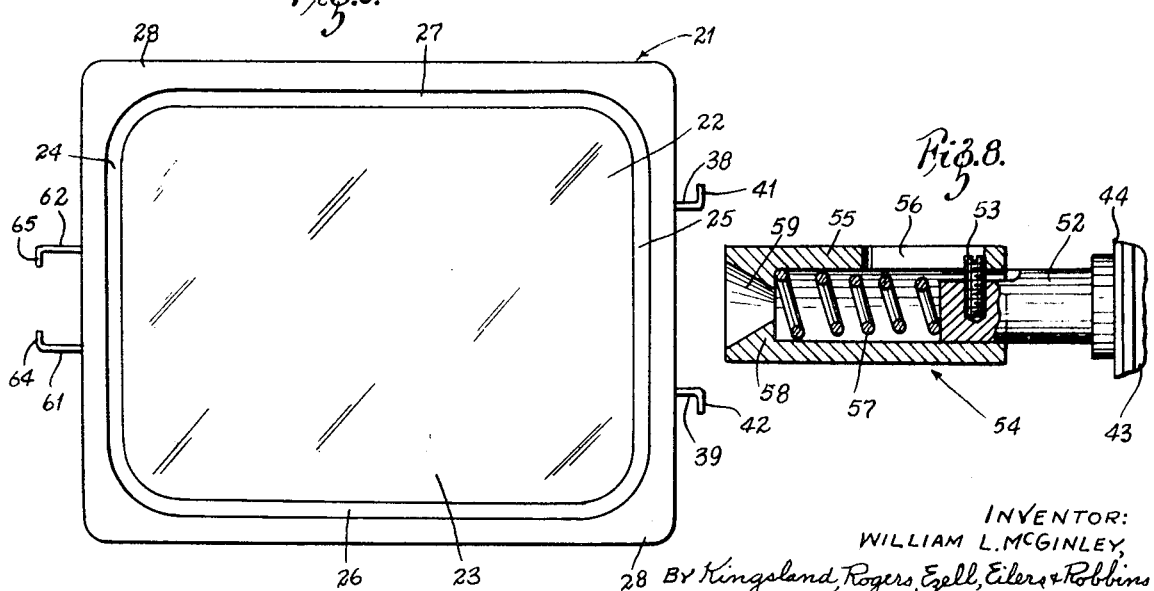

3,605,684
MOTOR-DRIVEN BUTTER ROLL
William L. McGinley, Dallas, Tex., assignor to American Home Products Corporation, New York, N.Y.
Filed Aug. 18, 1969, Ser. No. 850,868
Int. Cl. B05c 1/02
U.S. Cl. 118—13                                3 Claims

ABSTRACT OF THE DISCLOSURE

A motor-driven butter roll comprising a pan for containing butter, a drum rotatable through the pan for keeping the roll coated with liquid butter, a motor for rotating the drum, a slip-clutch drive between the motor and the roll, the butter being kept in liquid state by the heat from the motor, the parts being removable for easy cleaning and being separable from the motor to keep the motor free of cleaning liquid.

BRIEF DESCRIPTION OF THE INVENTION

In this motor-driven butter roll, a pan having a removable cover is kept filled with butter. The butter is maintained in a liquid state by the heat from a motor. The motor is there to rotate a drum through the liquid butter. Bread to be buttered is held against the surface of the rotating drum which, being coated with the liquid butter, transfers the liquid butter to the bread.

The drum is on a shaft that is removably mounted between a bracket and a clutch mechanism, the clutch mechanism being connected to the output shaft of the motor. Likewise, the motor can be removed from the pan and, at the opposite end, the bearing in which the opposite end of the drum shaft is journalled, can be removed. This enables cleaning of the pan, the drum, and all other components without subjecting the motor to the cleaning liquid.

Since the drum is motor-driven, it is in constant rotation, keeping its surface heated and always coated with liquid butter. The fresh heated film of liquid butter is therefore effectively and uniformly transferred to the bread held against the surface of the drum. The operator can determine the amounts of butter applied to the bread by the length of time he holds the bread against the drum.

BRIEF DESCRIPTION OF THE DRAWINGS

FIG. 1 is a top plan view of the motor-driven butter roll.

FIG. 2 is a front elevation view of the butter roll.

FIG. 3 is a bottom view of the butter roll.

FIG. 4 is a side elevational view of the butter roll as viewed from the left side of FIG. 1.

FIG. 5 is an enlarged view in section taken along the line 5—5 of FIG. 1 and is fragmentary.

FIG. 6 is an enlarged view in section taken along the line 6—6 of FIG. 1.

FIG. 7 is an enlarged fragmentary view in section taken along the line 7—7 of FIG. 2.

FIG. 8 is an enlarged fragmentary sectional view of the clutch drive.

FIG. 9 is a top plan view of the pan with the roll, motor, bearing support, and cover removed.

FIG. 10 is an enlarged, partially sectional, elevation view of the biasing and bearing support.

DETAILED DESCRIPTION OF THE INVENTION

This motor-driven butter roll 20 comprises a pan 21 having a well 22 in it for containing a pool of butter or artificial butter. The well 22 is defined by a bottom wall 23, side walls 24 and 25, a front wall 26, and a rear wall 27. The four walls 24, 25, 26 and 27 are inclined outwardly and their upper edges terminate in a continuous rounded rim 28. The continuous rounded rim 28 conveniently supports and locates a cover 30 that overlies the pan 21. The cover 30 has a continuous rounded outer rim 31 that rests upon the rounded rim 28 of the pan 21 with central flattened sections 32 at each side that serve as lift handles. Just inwardly of the rounded outer rim 31, the cover 30 has a continuous rounded well 33 having spaced openings 34 in it. The well 33 serves as a trough for collecting butter, and the openings 34 permit the collected butter to drain from the trough 33 into the well 22. Inwardly of the trough 33, the cover 30 has a rectangular opening 35.

A pair of laterally spaced bracket members 38 and 39 are fastened by rivets 40 to the right side wall 25 of the pan 21. The bracket members 38 and 39 have forwardly and rearwardly extending flanges 41 and 42 respectively. The flanges 41 and 42 diverge slightly toward thin upper ends. A motor 43 having a mounting plate 44 secured to it is mounted on the brackets 38 and 39, the mounting plate 44 having lateral channels 45 and 46 for receiving the flanges 41 and 42 on the brackets 38 and 39. The slight divergence of the flanges 41 and 42 and the channels 45 and 46 serves to locate and hold the motor 43. The motor 43 is powered by a cord 48 that may be provided with a plug for connection to a standard 110 volt outlet and is controlled by an on-off toggle switch 49.

The motor 43 has an output shaft 52. A set screw 53 is threaded into a side of the output shaft 52. A clutch connection 54 comprises a sleeve 55 mounted on the output shaft 52. The sleeve 55 has a slot 56 in its side into which the set screw projects. A compression spring 57 is compressed between the end of the motor output shaft 52 and an end wall 58 on the sleeve 55. The set screw 53 causes the sleeve 55 to rotate with the motor output shaft 52 but permits axial sliding movement of the sleeve 55. There is a tapered opening 59 in the end wall 58 of the sleeve 55.

Another pair of laterally spaced bracket supports 61 and 62 are fastened to the side wall 24 of the pan 21 by a plurality of rivets 63. The bracket supports 61 and 62 have inwardly extending vertical flanges 64 and 65 respectively.

A bearing support 66 has a pair of lateral slots 67 and 68 in it (see FIG. 10). The slots 67 and 68 have terminal upper edges 69 so that, with the bearing support 66 mounted between the bracket supports 61 and 62 and the flanges 64 and 65 projected into the slots 67 and 68, the terminal edges 69 vertically locate the bearing support 66. A bearing block 70 is rotatably mounted within the bearing support 66, on ball bearings (not shown) if desired. The bearing block 70 has a tapered opening 71 in it.

A roller assembly 74 comprises a shaft 75 having tapered ends 76 and 77. A pair of radial plates 78 and 79 are welded to the shaft 75. The plates 78 and 79 have annular flanges 80 and 81 respectively. A cylindrical stainless steel drum 82 is fitted onto and braised or welded to the annular flanges 80 and 81 of the radial plates 78 and 79. The drum 82 extends through the opening 35 in the cover 30.

The shaft 75 is mounted between the bearing block 70 and the clutch 54 with the tapered end 77 frictionally engaging the tapered opening 71 of the bearing block 70 and the tapered end 76 frictionally engaging the tapered opening 59 of the clutch sleeve 55. The compression spring 57 permits the sleeve 55 to be moved axially to the right from the position illustrated in FIG. 8 for engaging the shaft 75, and the compression spring 57 applies frictional force of sufficient magnitude to cause the shaft 75 to rotate with rotation of the motor output shaft 52, as the end 77 rotates with the bearing block 70. The diameter of the drum 82 is such that it rotates within the well 22 of the pan 21 in the pool of butter or artificial butter.

OPERATION

With the roll assembly 74 installed, the shaft 75 is located between the bearing block 70 and the clutch 54. When the motor 43 is actuated, its output shaft 52 rotates, rotating the clutch sleeve 55. The compression spring 57 applies axial pressure against the end 58 of the sleeve 55 and therefore against the bevelled end 76 of the shaft 75. This causes the shaft 75 carrying the drum 82 to rotate, the other end 77 of the shaft 75 rotating with the bearing block 70. The butter within the pan 21 is kept in a liquid state by the heat from the motor 43. Thus, no additional external heaters are required. As the drum 82 rotates, its cylindrical surface continually moves through the pool of butter within the pan 21, and the surface of the drum picks up a film of butter or artificial butter from the pan 21. Because the drum 82 is constantly rotating, its surface always has a substantially uniform film of butter on it, and because the surface 82 is always repeating its circulation through the pool of butter in the pan 21, the butter on the surface of the drum 82 is kept warm and flowable.

To butter bread, the surface of the bread is simply placed against the surface of the drum 82. The film of butter on the drum 82 is transferred to the bread as the bread is held against the drum 82 and as the drum 82 rotates past the bread. Since the drum 82 is constantly rotating, the amount of butter applied to the bread can be selectively varied with the length of time the bread is held against the surface of the drum 82. Accordingly, very close control is maintained over the quality of the buttered bread, and over the economics of the uniform use of butter on the bread.

When the supply of butter within the pan 21 runs low, the drum 82 is removed by pushing the shaft 75 axially toward the motor 43. This compresses the spring 57 as the sleeve 55 is pushed toward the shaft 52 until the end 77 is freed from the tapered opening 71 in the bearing block 70. Then the cover 30 may be removed and the butter replenished followed by replacement of the cover 30 and of the drum 82.

This butter roll assembly is very easy to clean, and all parts may be cleaned while the motor 43 is protected from cleaning liquids. For cleaning, the drum 82 and its shaft 75 are removed in the manner aforesaid. Then the bearing support 66 may be removed (and washed if needed, or set aside, if washing is not needed). Next, the motor 43 may be lifted from its bracket supports 38 and 39 leaving the pan 31 and its cover 30 for thorough washing. Thereafter, the motor 43, the bearing support 66, and the drum 82 may be quickly and easily replaced for resumption of the operation.

The clutch 54 makes it easy to remove the drum 82 without the use of any tools. In addition, the clutch 54 applies the proper pressure to the shaft 75 to permit it to rotate with the motor output shaft 52 so long as excess pressure is not applied to the surface of the drum 82. Should excess pressure be applied to the surface of drum 82, the resistance will overcome the friction between the end 58 of the sleeve 55 and the end 76 of the shaft 75 and the clutch 54 will slip, permitting the drum 82 to be held stationary as the motor output shaft 52 continues to rotate.

What is claimed is:

1. A butter roll assembly comprising a pan for containing a pool of butter, a motor having a rotary output shaft, means to mount the motor for support by the pan, a bearing, means to mount the bearing on the pan on a side opposite to that to which the motor is supported, said means including a bearing support, a tapered recess in the bearing block and means to support the bearing support on the pan comprising a pair of bracket members having vertical flanges, a pair of slots within the bearing support, the flanges being receivable within the slots, the slots having upper terminations adapted to rest on the upper edges of the flanges to locate the bearing support, a shaft having a tapered end, the tapered end being positionable within the tapered recess of the bearing support, a drum mounted on the shaft, the shaft being mounted between the bearing and the motor, and drive means between the motor output shaft and the drum shaft.

2. The butter roll assembly of claim 1 wherein the motor is mounted on a bracket, and sliding connections between the bracket and the motor to permit removal of the motor for cleaning all parts of the butter roll without subjecting the motor to cleaning liquids.

3. A butter roll assembly comprising a pan for containing a pool of butter, a motor having a rotary output shaft, a bracket to mount the motor for support by the pan, a bearing, means to mount the bearing on the pan on a side opposite to that to which the motor is supported, a shaft, a drum mounted on the shaft, the shaft being mounted between the bearing and the motor, and drive means between the motor output shaft and the drum shaft, and sliding connections between the bracket and the motor to permit removal of the motor for cleaning all parts of the butter roll without subjecting the motor to cleaning liquids.

References Cited

UNITED STATES PATENTS

| | | | |
|---|---|---|---|
| 1,150,063 | 8/1915 | Remnsnider | 118—258X |
| 1,217,746 | 2/1917 | Graf | 64—30RA |
| 1,238,654 | 8/1917 | Ewart | 64—30RA |
| 1,743,884 | 1/1930 | Dewitt | 118—258X |
| 2,554,131 | 5/1951 | Vachon | 118—258X |
| 2,664,068 | 12/1953 | Osgood | 118—258 |
| 2,915,038 | 12/1959 | Wallenberg | 118—258X |

JOHN P. McINTOSH, Primary Examiner

U.S. Cl. X.R.

64—30R; 118—17